US009091812B2

(12) United States Patent
Hashimura et al.

(10) Patent No.: US 9,091,812 B2
(45) Date of Patent: Jul. 28, 2015

(54) ENERGY-EFFICIENT TRANSPARENT SOLAR FILM

(71) Applicant: Sharp Laboratories of America, Inc., Camas, WA (US)

(72) Inventors: Akinori Hashimura, Vancouver, WA (US); Douglas Tweet, Camas, WA (US); Gary Hinch, Vancouver, WA (US); Alexey Koposov, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 206 days.

(21) Appl. No.: 13/872,473

(22) Filed: Apr. 29, 2013

(65) Prior Publication Data

US 2013/0258456 A1 Oct. 3, 2013

Related U.S. Application Data

(63) Continuation-in-part of application No. 13/714,073, filed on Dec. 13, 2012, which is a continuation-in-part of application No. 13/558,396, filed on Jul. 26, 2012, now Pat. No. 8,767,282, which is a (Continued)

(51) Int. Cl.
*G02F 1/03* (2006.01)
*G02B 5/20* (2006.01)
*G02B 5/00* (2006.01)
*B82Y 20/00* (2011.01)
*B82Y 30/00* (2011.01)

(52) U.S. Cl.
CPC ............... *G02B 5/208* (2013.01); *B82Y 20/00* (2013.01); *G02B 5/008* (2013.01); *G02B 5/206* (2013.01); *B82Y 30/00* (2013.01); *Y10S 977/834* (2013.01)

(58) Field of Classification Search
USPC .......................................... 359/245
See application file for complete search history.

(56) References Cited

U.S. PATENT DOCUMENTS 5,518,810 A   5/1996   Nishihara et al.
5,942,331 A   8/1999   Miyauchi et al.

(Continued)

FOREIGN PATENT DOCUMENTS

JP   2000-098323   4/2000
JP   2010-185970   8/2010

(Continued)

OTHER PUBLICATIONS

Bohren and Hoffman, Absorption and Scattering of Light by Small Particles, Wiley-VCH (2004).

(Continued)

*Primary Examiner* — James Jones
(74) *Attorney, Agent, or Firm* — Law Office of Gerald Maliszewski; Gerald Maliszewski

(57) ABSTRACT

An energy-efficient transparent solar film is presented. The solar film has a first film layer with metal nanostructures. The metal nanostructures have plasmon resonances in wavelength bands greater than, or both less than and greater than visible wavelengths, depending on size and shape. The metal nanostructures have no plasmon resonance at visible wavelengths. In another aspect, metal oxide nanocrystals are formed with the first film layer. The metal oxide nanocrystals have absorption in a band of wavelengths less than visible wavelengths, and absorption in a band of wavelengths greater than visible wavelengths. Also provided is a solar film window and fabricating method.

23 Claims, 11 Drawing Sheets

Related U.S. Application Data continuation-in-part of application No. 13/449,370, filed on Apr. 18, 2012, now Pat. No. 8,896,907, which is a continuation-in-part of application No. 13/434,548, filed on Mar. 29, 2012, now Pat. No. 8,810,897, which is a continuation-in-part of application No. 12/836,121, filed on Jul. 14, 2010, now Pat. No. 8,368,998, which is a continuation-in-part of application No. 12/646,585, filed on Dec. 23, 2009, now Pat. No. 8,223,425, which is a continuation-in-part of application No. 12/635,349, filed on Dec. 10, 2009, now Pat. No. 8,355,099, which is a continuation-in-part of application No. 12/621,567, filed on Nov. 19, 2009, now Pat. No. 8,339,543, which is a continuation-in-part of application No. 12/614,368, filed on Nov. 6, 2009, now Pat. No. 8,045,107.

(56) References Cited

U.S. PATENT DOCUMENTS

| 6,060,154 | A | 5/2000 | Adachi et al. |
| 6,506,487 | B2 | 1/2003 | Nagai |
| 6,663,950 | B2 | 12/2003 | Barth et al. |
| 7,538,355 | B1 * | 5/2009 | Tuli et al. ............ 257/85 |
| 7,906,202 | B2 | 3/2011 | Padiyath et al. |
| 2007/0154721 | A1 | 7/2007 | Wang et al. |
| 2009/0159858 | A1 | 6/2009 | Noguchi et al. |
| 2011/0006269 | A1 | 1/2011 | Petruska et al. |
| 2011/0094416 | A1 | 4/2011 | Kawai et al. |
| 2013/0240037 | A1 | 9/2013 | Yui |

FOREIGN PATENT DOCUMENTS

| JP | 2010-208922 | 9/2010 |
| JP | 2010-243981 | 10/2010 |
| JP | 2011-094471 | 5/2011 |
| JP | 2013-077007 | 4/2013 |
| WO | WO2012071507 | 5/2012 |

OTHER PUBLICATIONS http://energy.gov/energysaver/articles/challenge-improving-energy-efficiency-buildings-across-nation.

* cited by examiner

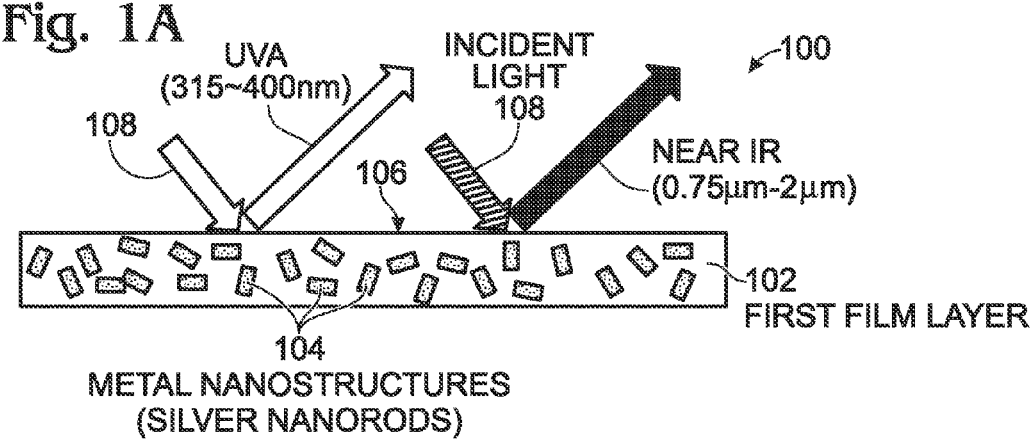
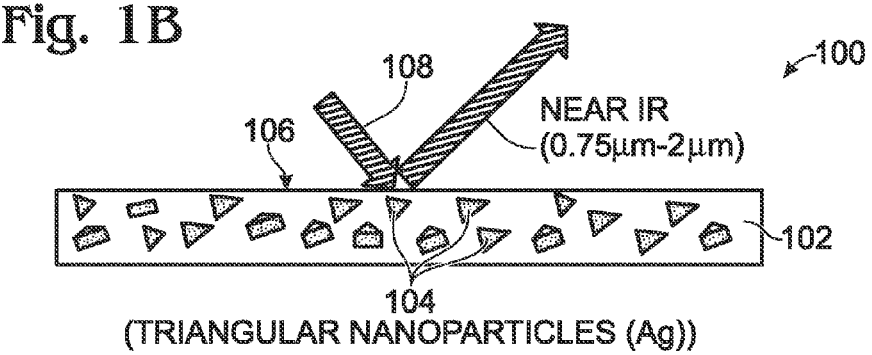
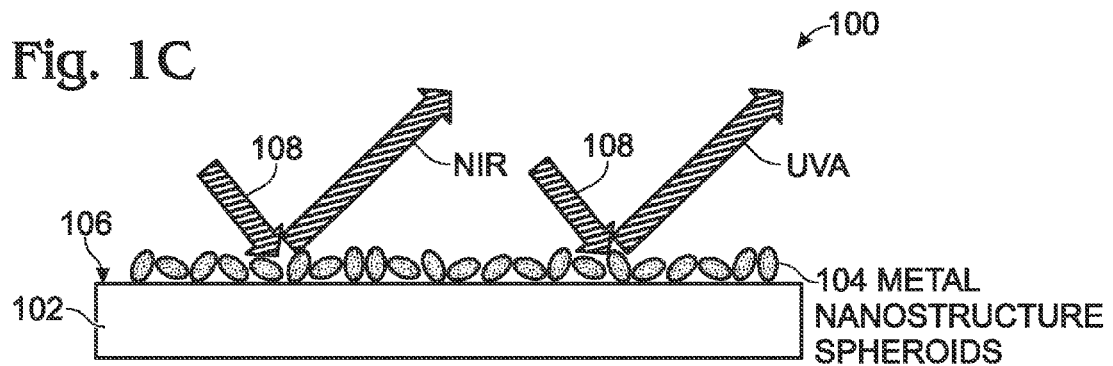

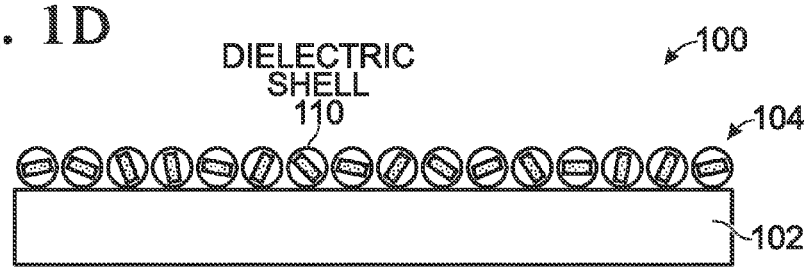
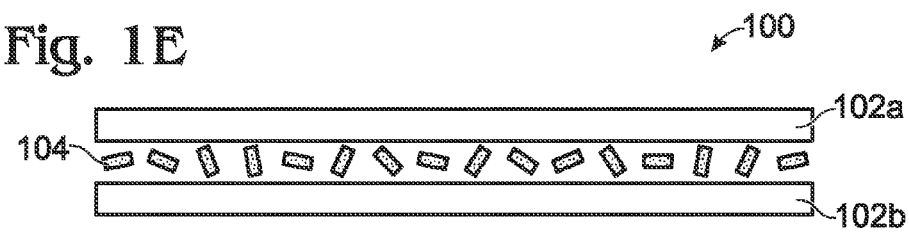
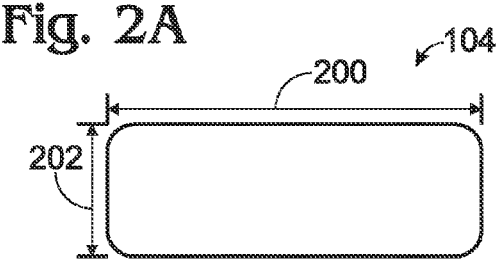
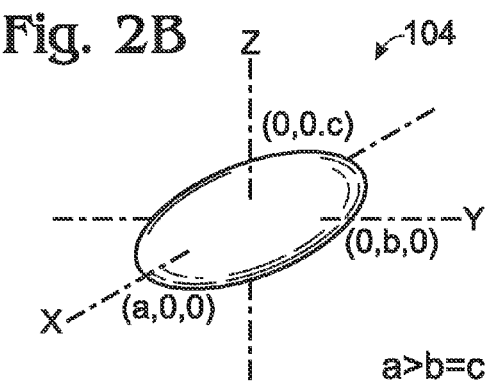
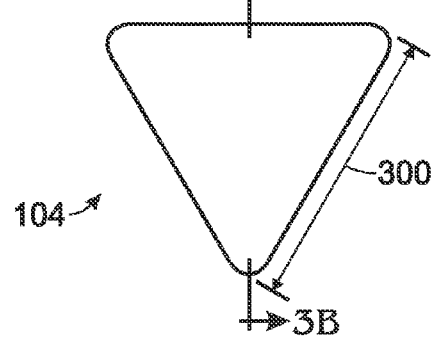
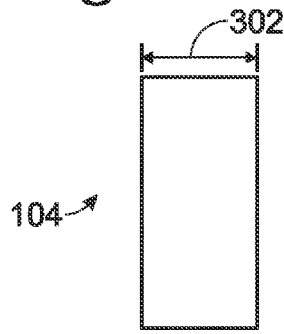

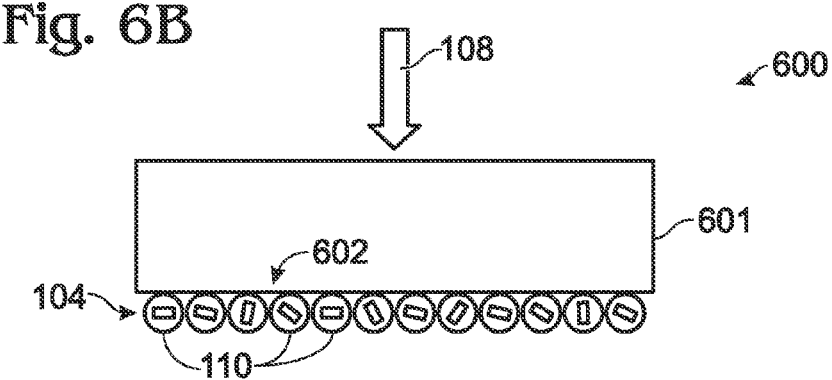
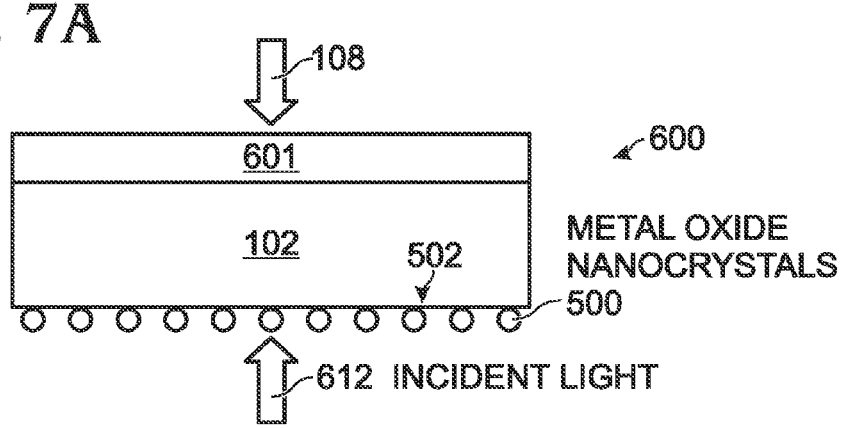
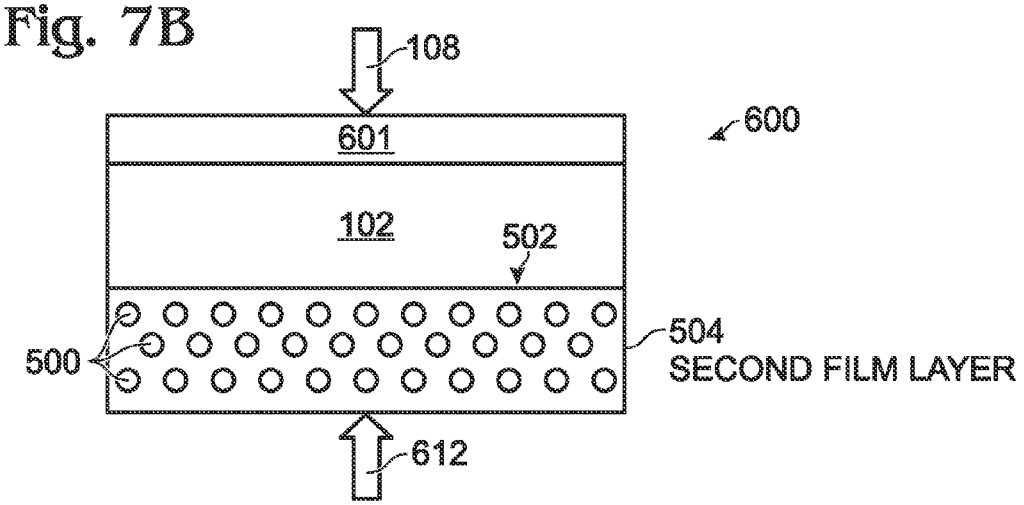

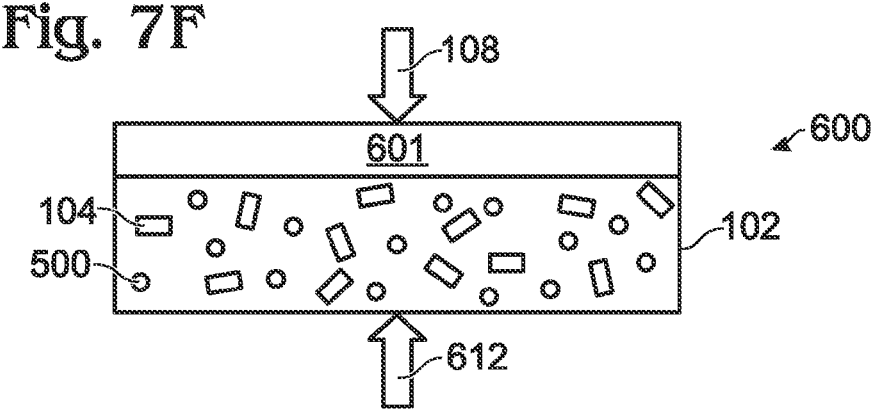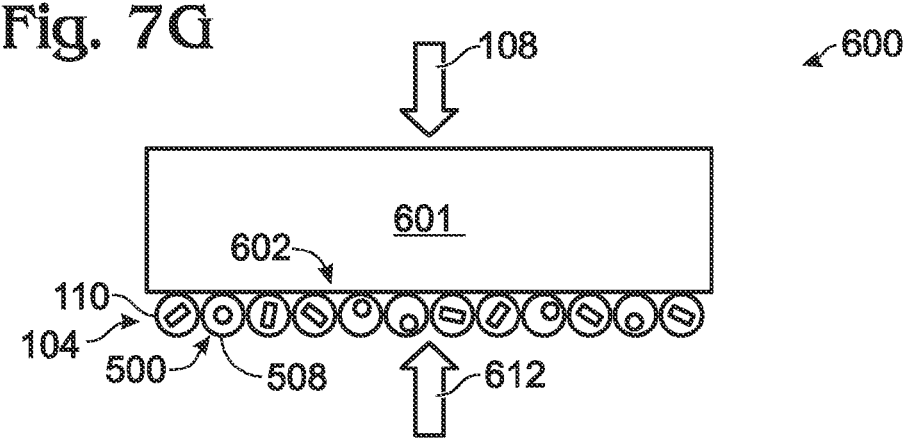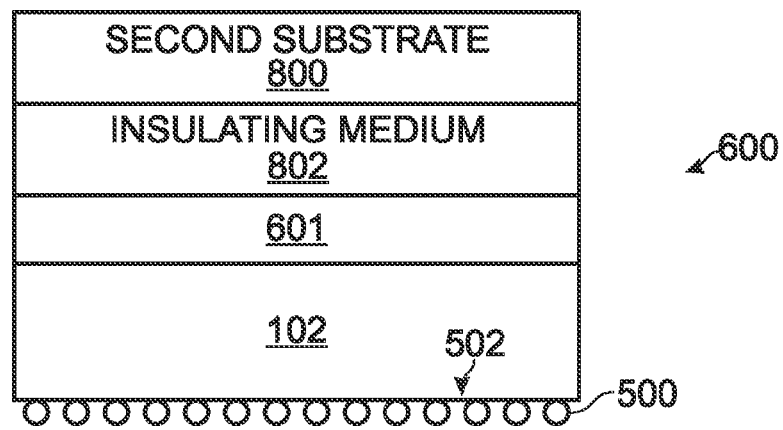

ENERGY-EFFICIENT TRANSPARENT SOLAR FILM

RELATED APPLICATION

The application is a Continuation-in-Part of an application entitled, AIR STABLE, COLOR TUNABLE PLASMONIC STRUCTURES FOR ULTRAVIOLET (UV) AND VISIBLE WAVELENGTH APPLICATIONS, invented by Aki Hashimura et al., Ser. No. 13/714,073, filed on Dec. 13, 2012.

which is a Continuation-in-Part of an application entitled, PLASMONIC IN-CELL POLARIZER, invented by Aki Hashimura et al., Ser. No. 13/558,396, filed on Jul. 26, 2012.

which is a Continuation-in-Part of an application entitled, PLASMONIC REFLECTIVE DISPLAY FABRICATED USING ANODIZED ALUMINUM OXIDE, invented by Aki Hashimura et al., Ser. No. 13/449,370, filed on Apr. 19, 2012.

which is a Continuation-in-Part of an application entitled, METHOD FOR IMPROVING METALLIC NANOSTRUCTURE STABILITY, invented by Aki Hashimura et al., Ser. No. 13/434,548, filed on Mar. 29, 2012.

which is a Continuation-in-Part of an application entitled, PLASMONIC ELECTRONIC SKIN, invented by Tang et al., Ser. No. 12/836,121, filed on Jul. 14, 2012, now U.S. Pat. No. 8,368,998;

which is a Continuation-in-Part of an application entitled, PLASMONIC DEVICE TUNED USING PHYSICAL MODULATION, invented by Tang et al., Ser. No. 12/646,585, filed on Dec. 23, 2009, now U.S. Pat. No. 8,223,425;

which is a Continuation-in-Part of an application entitled, PLASMONIC DEVICE TUNED USING LIQUID CRYSTAL MOLECULE DIPOLE CONTROL, invented by Tang et al., Ser. No. 12/635,349, filed on Dec. 10, 2009, now U.S. Pat. No. 8,355,099;

which is a Continuation-in-Part of an application entitled, PLASMONIC DEVICE TUNED USING ELASTIC AND REFRACTIVE MODULATION MECHANISMS, invented by Tang et al., Ser. No. 12/621,567, filed on Nov. 19, 2009, now U.S. Pat. No. 8,339,543;

which is a Continuation-in-Part of an application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, now U.S. Pat. No. 8,045,107. All the above-referenced applications are incorporated herein by reference.

BACKGROUND OF THE INVENTION

1. Field of the Invention

This invention generally relates to an energy efficient transparent film and, more particularly, to a solar film layer(s) capable of transmitting desired wavelengths of light in the visible band, while blocking wavelengths outside the visible band.

2. Description of the Related Art

According to U.S. Dept. of Energy, homes and commercial buildings consume approximately 40% of the energy used in the United States, costing consumers approximately US$200 billion annually [1]. With growing awareness of energy conservation, green building and fuel efficient transportation, the smart windows segment in the energy efficient green technology market has rapidly grown in recent years. Moreover, energy efficient windows are influenced and promoted strongly by governmental regulation (U.S. Dept. of Energy and U.S. Environmental Protection Agency) to meet the criteria of ENERGY STAR label, which accounts for approximately 60% of all the building windows in the United States.

Concurrent with these demands are the different smart windows technologies that currently exist or are emerging in the market that provide important growth opportunities from materials suppliers, glass/window manufacturers, to end users such as builders, and building/home owners. Some of the competing technologies include electrochromic windows, low-e glass windows, and solar control films that can be attached to the existing windows.

Many different types of solar control films have been invented in the past. A conventional solar control film may be comprised of multiple layers of very thin reflective metal such as silver or aluminum, which is deposited on a transparent substrate by vacuum or vapor deposition. However, these films are not a cost effective solution due to the need for large and expensive equipment that increases the manufacturing cost. Furthermore, these films tend to block significant amounts of visible light. Moreover, metal film is highly conductive, so the films interfere with wireless radio and microwave frequency signals that are often transmitted through the building or automobile windows.

Another type of solar film includes a multilayer polymer film, as described in U.S. Pat. No. 7,906,202 [2]. Since these films do not include conventional heat rejecting metal layers, the solar films do not block radio frequency (RF) or microwave signals. However, the reflective and transmissive properties of multilayer polymer film are a function of the refractive indices of the respective layers, and to achieve a significant reflective performance at specific bandwidths many layers are needed, which increases the overall manufacturing cost. These films have varying performance at different viewing angles.

Other types of solar films use inorganic metal oxide particles such as indium tin oxide [3], antimony tin oxide [4], or a mix of different UV and near IR rejecting metal oxide nanoparticles that include iron oxide or hydroxide oxide for UV rejection; and ruthenium oxide, titanium nitride, tantalum nitride, titanium silicide, molybdenum silicide, and lanthanum boride for IR rejection [5]. However, many of these metal oxides particles are either very difficult or expensive to manufacture in the large scale quantities that are needed for the sizable surface area of windows. Furthermore, for many of the metal oxides it is difficult to achieve high transmission across the entire visible wavelength range, resulting an opaque or tint colored film.

Recently, a method to generate aluminum-doped zinc oxide nanocrystals has been disclosed [6]. Although metal-doped zinc oxide nanocrystals give high transmission in the visible wavelength range and reject IR wavelength above ~1.5 microns ($\mu m$), the chemical synthesis requires some fairly expensive reducing agents, which increases the overall material cost of manufacturing.

Finally, many of the common metal oxide particles (including metal-doped zinc oxide) do not reject well in near IR wavelengths below 1.5 $\mu m$, a solar spectrum range that includes a significant amount of solar heat energy that is transmitted through the windows.

[1] http://energy.gov/energysaver/articles/challenge-improving-energy-efficiency-buildings-across-nation.
[2] U.S. Pat. No. 7,906,202B2 3M innovative Properties Co.
[3] U.S. Pat. No. 5,518,810 Mitsubishi Materials Co.
[4] U.S. Pat. No. 6,663,950B2 CP Films, Inc.
[5] U.S. Pat. No. 6,060,154 Sumitomo Metal Mining Co., Ltd.
[6] WO2012071507 The Regents of University of California at Berkeley.
[7] Bohren & Huffman, *Absorption and Scattering of Light by Small Particles*, Wiley-VCH (2004).

It would be advantageous if a solar control film could be manufactured at a very low-cost and still provide good light rejection in both UV and broadband IR spectral ranges.

It would be advantageous if a solar control film could conserve electricity costs not only from cooling, but also from heating by rejecting thermal heat at mid-wavelength IR spectrum (2-8 µm), to provide heat insulation inside a building.

SUMMARY OF THE INVENTION

Disclosed herein is a device that may incorporate metal nanostructures in dielectric film to realize a low-cost and highly efficient transparent solar film. In one aspect, metal nanostructures having plasmon resonances in ultraviolet A (UVA), at wavelengths of 315-400 nanometers (nm), and/or near infrared (IR) wavelength spectra (0.75-2.0 microns (µm), are incorporated into a window film to reject solar energy. The metal nanostructures include silver nanorods or nanobars that have an anisotropy in long and short axis dimensions. For example, silver nanorods/nanobars with different aspect ratios may be mixed in a visibly transparent organic film substrate to realize a passive solar film that can reject solar energy in both near UV and near IR spectral ranges. Other metal nanostructures include triangular nanoplates that have plasmon resonances outside the visible wavelength range in the near IR regime. The metal nanostructures can be comprised of one material, or have two or more layers such as core-shell nanostructures. The core material can be of any metal that has plasmon resonances in the near IR spectrum such as silver, copper, gold, titanium nitride (TiN), indium tin oxide (ITO), aluminum-doped zinc oxide (AZO), and gallium-doped zinc oxide (GZO). The shell material can be of any material that has good stability in ambient environments, such as silicon oxide, semiconductor oxide, or metal oxide. These plasmonic structures can enhance the efficiency of solar energy rejection by scattering or absorbing most of the incoming sunlight at particular wavelengths. Having a solar film that rejects in both the UV and near IR spectra insures not only the insulation of buildings from near IR solar heat, but also prevents harmful UV rays penetrating through the windows.

In another aspect, the device may include metal oxide nanocrystals that may be incorporated in a dielectric film, and combined with the metal nanostructures. Metal oxide nanocrystals include materials such as metal-doped zinc oxide that can reject solar heat in the mid-wavelength IR spectrum (2-8 µm). Zinc oxide nanoparticles are doped with different concentrations of aluminum during manufacturing to tune the absorption rate in the desired spectra range. Metal-doped zinc oxide nanocrystals can reject solar energy not only in the UV wavelength range, but also in the mid-wavelength infrared range (2-8 µm). Having a solar film that rejects thermal heat insures that heat generated inside a building does not escape through the windows, thereby providing energy saving.

Also provided is a method of manufacturing low cost metal oxide nanocrystals such as aluminum-doped zinc oxide nanocrystals that requires much fewer steps compared to the prior art [6]. In manufacturing aluminum doped zinc oxide nanocrystals, an expensive precursor mixture is eliminated from the process of fabricating aluminum doped zinc oxide, to reduce the overall cost of manufacturing. Further, core-shell doped semiconductor nanocrystals provide better environmental stability, as compared to nanocrystals without the shell structures. Primarily, zinc oxide is known to be unstable in acidic environmental conditions. Therefore, a window film made from these nanocrystals is susceptible to chemical degradation in wet weather where the acidic concentration in air is higher than dry weather. Therefore, nanocrystals with a shell of $TiO_2$ or $SnO_2$ layer over an aluminum doped zinc oxide core structure improves reliability. A material that is more robust to different weather conditions is desirable, especially for building integrated window film.

Accordingly, an energy-efficient transparent solar film is presented. The solar film has a first film layer with metal nanostructures. The metal nanostructures have plasmon resonances in wavelength bands that are either greater than visible wavelengths, or in wavelengths both less than and greater than visible wavelengths, depending on size and shape. The metal nanostructures have no plasmon resonance at visible wavelengths. As a result, the solar film transmits incident light more efficiently in the visible wavelengths than in the wavelengths in which the plasmon resonances occur.

In another aspect, metal oxide nanocrystals are either included in the first film layer with the metal nanostructures, or formed in a second film layer. The metal oxide nanocrystals have a first absorption in a band of wavelengths less than visible wavelengths, and a second absorption in a band of wavelengths greater than visible wavelengths, both of which are greater than any absorption in the band of visible wavelengths. As a result, the solar film transmits incident light more efficiently in the visible wavelengths than in wavelengths both less than visible wavelengths and greater than visible wavelengths.

Additional details of the above-described solar film, a solar film window, and a method for fabricating a solar film are provided below.

BRIEF DESCRIPTION OF THE DRAWINGS

FIGS. 1A through 1E are partial cross-sectional views of an energy-efficient transparent solar film.

FIGS. 2A and 2B are, respectively, partial cross-sectional views of a metal nanostructure rod and a metal nanostructure spheroid.

FIGS. 3A and 3B are, respectively, plan and partial cross-sectional views of triangular plate metal nanostructures.

FIGS. 6A and 6B are partial cross-sectional views of an energy-efficient window.

FIGS. 7A through 7G are partial cross-sectional views of the energy-efficient window further comprising metal oxide nanocrystals, in addition to metal nanostructures.

FIG. 8 is a partial cross-sectional view of a variation of the energy-efficient window of FIG. 7A.

DETAILED DESCRIPTION

Figure 4:
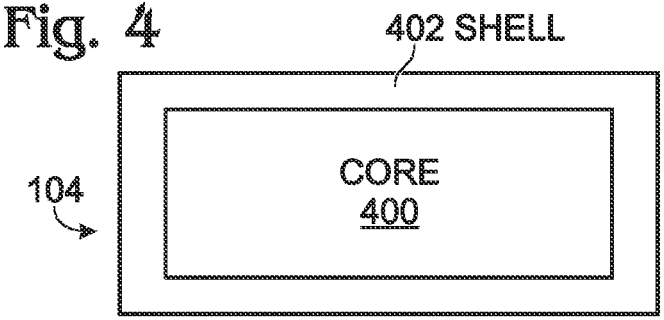
FIG. 4 is a partial cross-sectional view of a core/shell variation of the metal nanostructure.

FIGS. 1A through 1E are partial cross-sectional views of an energy-efficient transparent solar film. The solar film 100 comprises a first film layer 102. Typically, the film is a dielectric material transparent at visible wavelengths of light. As used herein, the visible wavelengths of light are approximately in the range of 400 to 700 nanometers (nm), although the definition of the high and low values may vary depending upon individual perception and the degree of visibility. Metal nanostructures 104 are included in the first film layer 102 in a number of configurations. In FIGS. 1A and 1B, the metal nanostructures 104 are embedded in the first film layer 102. In FIG. 1C, the metal nanostructures 104 overlie the first surface 106 of the first film layer 102. In FIG. 1D, the metal nanostructures overlie the first film first surface 106, and are coated or encapsulated by a transparent dielectric shell material 110. In FIG. 1E the metal nanostructures 104 are sandwiched between two sheets of dielectric material 102a and 102b. In any of these configurations, the metal nanostructures 104 may have one of two types of plasmon resonances. In one aspect, the plasmon resonances occur just in wavelengths greater than visible wavelengths, such as with the use of triangular plates. Alternatively, the plasmon resonances occur in wavelengths both less than and greater than visible wavelengths, such as associated with the use of rods or spheroids. Either way, the metal nanostructures 104 have no plasmon resonance at visible wavelengths. As a result, the solar film 100 transmits incident light 108 more efficiently in the visible wavelengths than in the wavelengths in which the plasmon resonances occur. For example, the solar film may transmit at least 70% of incident light in the visible wavelengths. It should be understood that the metal nanostructures are not drawn to scale.

As quoted from the FUNDAMENTALS OF PHYSICS, by David Halliday and Robert Resnick, Wiley, 1974, "(i)n general, whenever a system capable of oscillating is acted on by a periodic series of impulses having a frequency equal or nearly equal to one of the natural frequencies of oscillation of the system, the system is set into oscillation with relatively large amplitude. This phenomenon is called resonance and the system is said to resonant with the applied impulses." As is well known in the art, plasmon resonance may also be referred to as "localized surface plasmon" or "localized plasmon resonance". As noted in "Plasmonics: Fundamentals and Applications" by Stefan A. Maier (Springer, 2007), p. 65.), localized surface plasmons are non-propagating excitations of the conduction electrons of metallic nanostructures coupled to the electromagnetic field. These modes arise naturally from the scattering problem of a small, sub-wavelength conductive nanoparticle in an oscillating electromagnetic field. The curved surface of the particle exerts an effective restoring force on the driven electrons, so that a resonance can arise, leading to field amplification both inside and in the near-field zone outside the particle. Another consequence of the curved surface is that plasmon resonances can be excited by direct light illumination.

Alternatively stated, incident light makes electrons in a small metallic particle oscillate back and forth. At certain frequencies of light (or, equivalently, wavelengths) the electrons respond very strongly, resulting in a dramatic increase in the absorption and/or scattering of the light. These are called plasmon resonances, and the frequencies at which they occur are called resonance frequencies. These resonances depend on the optical properties of the particle, its size and shape, and the optical properties of the surrounding medium. Thus, "plasmonic resonance" means a strong increase in polarizahility over a relatively narrow range of wavelengths. At the peak in resonance, the polarizabilty can be 10 to 100 times or more stronger than in neighboring wavelength ranges. The peak may have a full width at half magnitude (FWHM) of about 50 nm or less.

In one aspect, the metal nanostructure morphology is that of a rod (FIGS. 1A, 1D, and 1E), a spheroid (FIG. 1C), or a combination of rods and spheroids (not shown). Then, the plasmon resonances are in the ultraviolet A (UVA) wavelength and near infrared (NIR) wavelength bands. Although a rod morphology is shown in FIGS. 1A, 1D, and 1E, the depicted first film layer can alternatively be comprised of spheroids, triangular plates, or a combination of the above-mentioned morphologies. It should be noted that rods and spheroids have similar optical properties.

FIGS. 2A and 2B are, respectively, partial cross-sectional and perspective views of a metal nanostructure rod and a metal nanostructure spheroid. These metal nanostructures 104 have a maximum cross-sectional dimension (long axis) 200 of 200 nm and a minimum cross-sectional dimension (short axis) 202 of 5 nm. Although not explicitly labeled in FIG. 2B, the long axis is equal to 2a and the short axis is equal to 2b or 2c. Further, the metal nanostructures 104 have an aspect ratio between the long axis 200 and short axis 202 in the range of about 4 to 15. In one aspect, the metal nanostructures 104 have a Gaussian distribution of aspect ratios in the first range, with a random long axis orientation. That is, the long axes are not aligned in parallel or in a single plane. Note: the drawings are not to scale. In addition, it should be understood that the rod, spheroid, and triangular plate structures may have rounded edges.

Returning to FIG. 1B, the metal nanostructures 104 may have a triangular plate morphology with a plasmon resonance in the NIR band of wavelengths. In another aspect not shown, the triangular plates may be combined with rod and/or spheroid morphologies.

FIGS. 3A and 3B are, respectively, plan and partial cross-sectional views of triangular plate metal nanostructures. The triangular plate metal nanostructures 104 have side lengths 300 in the range between about 50 and 250 nm, and a thickness 302 in the range of about 10 to 50 nm. Note: the sides 300 of the triangular plate metal nanostructures need not necessarily by equilateral.

FIG. 4 is a partial cross-sectional view of a core/shell variation of the metal nanostructure. In this aspect, the metal nanostructure comprises a metal core 400 and a shell 402 surrounding the metal core 400 made from a material such as silica, a metal oxide, or semiconductor oxide. Although a rod morphology is shown, spheroid and triangular plate core/shell structures can also be formed. Typically, the metal nanostructures, or core/shell structure cores, are a material such as silver (Ag), gold (Au), copper (Cu), titanium nitride (TiN), indium oxide (ITO), aluminum-doped zinc oxide (AZO), or gallium-doped zinc oxide (GZO).

Figure 5A:
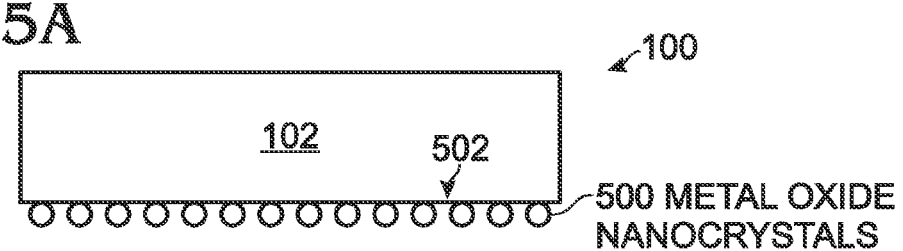
FIGS. 5A through 5F are partial cross-sectional views of the solar film further comprising metal oxide nanocrystals, in addition to metal nanostructures.
Figure 5B:
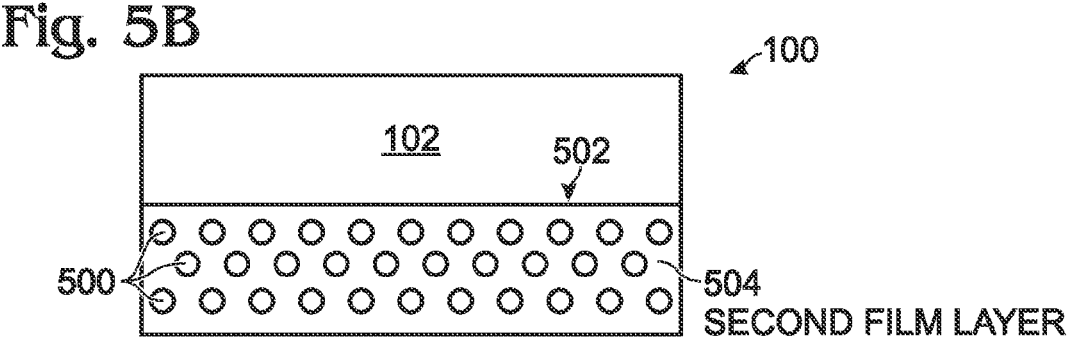
Figure 5C:
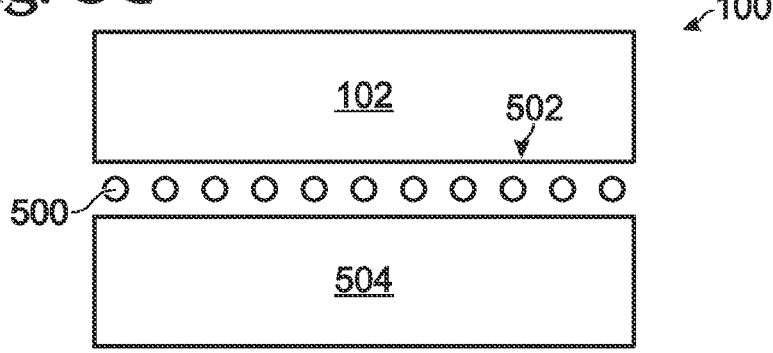
Figure 5D:
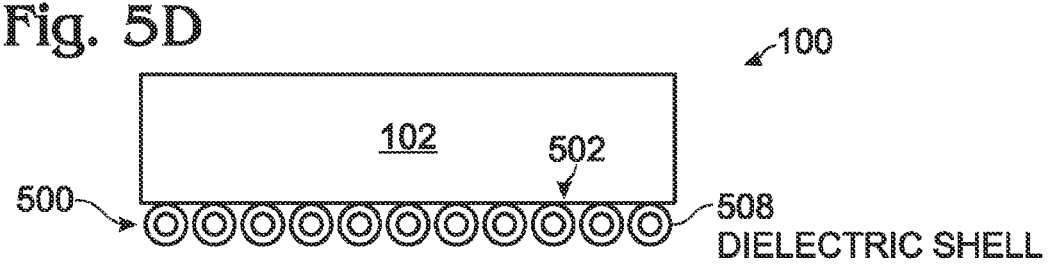
Figure 5E:
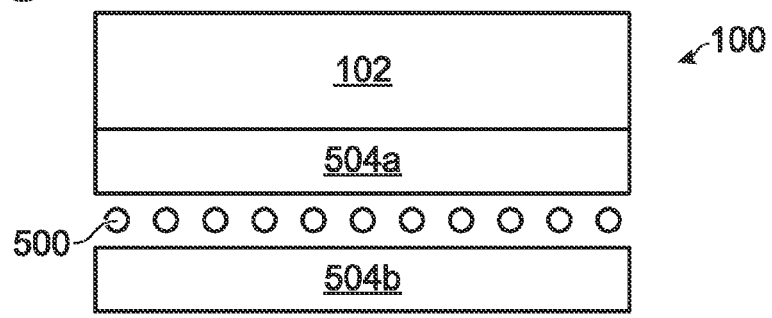
Figure 5F:
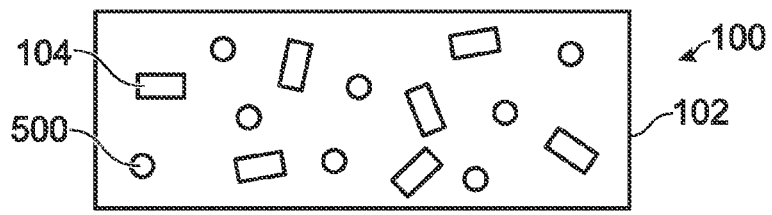

FIGS. 5A through 5F are partial cross-sectional views of the solar film further comprising metal oxide nanocrystals, in addition to metal nanostructures. The metal oxide nanocrystals 500 may be formed in a number of configurations. The metal oxide nanocrystals may be formed overlying a second surface 502 of the first film layer 102, as shown in FIG. 5A, embedded in a second film layer 504 that overlies first film layer second surface 502, as shown in FIG. 5B, sandwiched between a first surface 506 of the second film layer 504 and the second surface 502 of the first film layer 102, as shown in FIG. 5C, overlying the second surface 502 of the first film layer 102 and encapsulated by a dielectric shell 508, as shown in FIG. 5D, sandwiched between two sheets of dielectric material 504a and 504a overlying first film layer second surface 502, as shown in FIG. 5E, or combined with the metal nanostructures 104 in the first film layer 102, as shown in FIG.

5F. For simplicity, the first film layer is simply designated as 102, but it should be understood that the first film layer of FIGS. 5A through 5E may be configured as described above in the explanation of FIGS. 1A through 1E. It should also be understood that the first film layer of FIGS. 5A through 5F may be enabled using the rod, spheroid, or triangular plate morphologies.

Typically, the second film layer 504 is made of a dielectric material that is transparent in the visible wavelengths of light. The metal oxide nanocrystals 500 have a first absorption in a band of wavelengths less than visible wavelengths, and a second absorption in a band of wavelengths greater than visible wavelengths. The first and second absorptions are greater than any absorption that occurs in the band of visible wavelengths. For example, the first absorption may occur in the band of UV wavelengths and second absorption occurs in the band of IR wavelengths greater than 1.5 microns. As a result, the solar film 100 transmits incident light more efficiently in the visible wavelengths than in wavelengths both less than visible wavelengths and greater than visible wavelengths.

As used herein, "absorption" refers to light that is not scattered or transmitted. It is absorbed by a material (i.e. the metal oxide nanocrystals) and turned into other forms of energy, typically heat. The first absorption is a local maximum—the wavelength(s) at which the maximum absorption occurs within a band of wavelengths less than visible light wavelengths. Likewise, the second absorption is another local maximum, or the wavelength(s) at which the maximum absorption occurs within a band of wavelengths greater than visible light wavelengths. In one aspect, the first and second absorption are wavelengths at which the metal oxide nanocrystals absorb more than 70% of the light. The absorption in the visible band is typically less than 10% of incident light.

In one aspect, the metal oxide nanocrystals 500 are a material such as indium tin oxide, antimony tin oxide, indium zinc oxide, GZO, or AZO. This is not an exhaustive list of possible materials. In another aspect, the metal oxide nanocrystals comprise a metal oxide core, and a shell surrounding the metal oxide core made from a material such as titanium oxide or tin oxide.

Figure 6A:
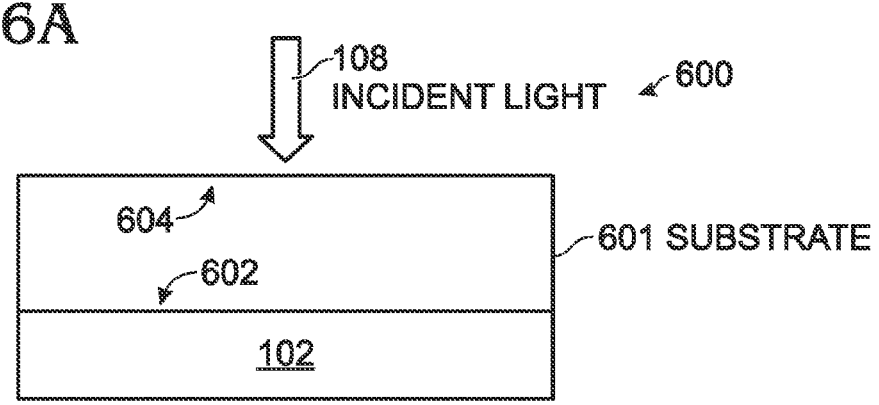

FIGS. 6A and 6B are partial cross-sectional views of an energy-efficient window. The window 600 comprises a substrate 601, such as glass or plastic for example, with a first surface 602 and a second surface 604, transparent in visible wavelengths of light. As shown in FIG. 6A, metal nanostructures overlie the substrate first surface 602 in the first film layer 102, in one of the configurations explained in the description of FIGS. 1A through 1E, above. As an alternative, shown in FIG. 6B, the metal nanostructures 104 may be formed directly overlying the substrate first surface 602 and coated with a dielectric shells 110. As explained above, the metal nanostructure plasmon resonances either occur at wavelengths greater than visible wavelengths (e.g. FIR), or wavelengths both less than and greater than visible wavelengths (e.g. UVA and NIR). The metal nanostructures 104 have no plasmon resonance at visible wavelengths. As a result, the window 600 transmits light 108, incident the substrate first surface 602, more efficiently in the visible wavelengths than in the wavelengths greater than, and less than the visible wavelengths. Details of the metal nanostructures and their optical characteristics have been presented above and are not repeated here in the interest of brevity.

Figure 7C:
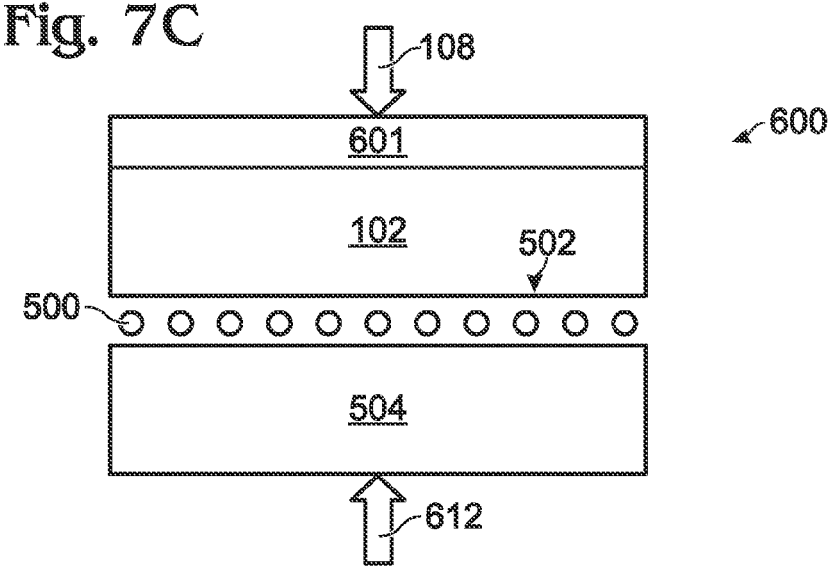
Figure 7D:
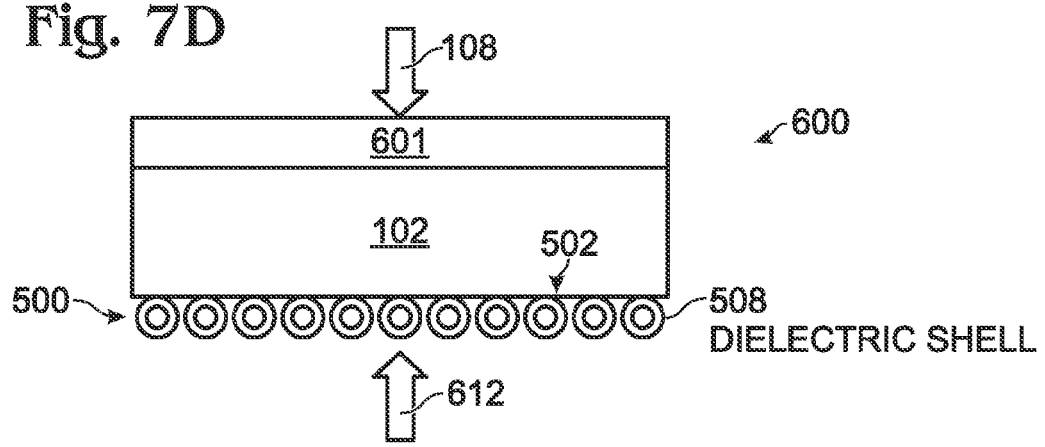
Figure 7E:
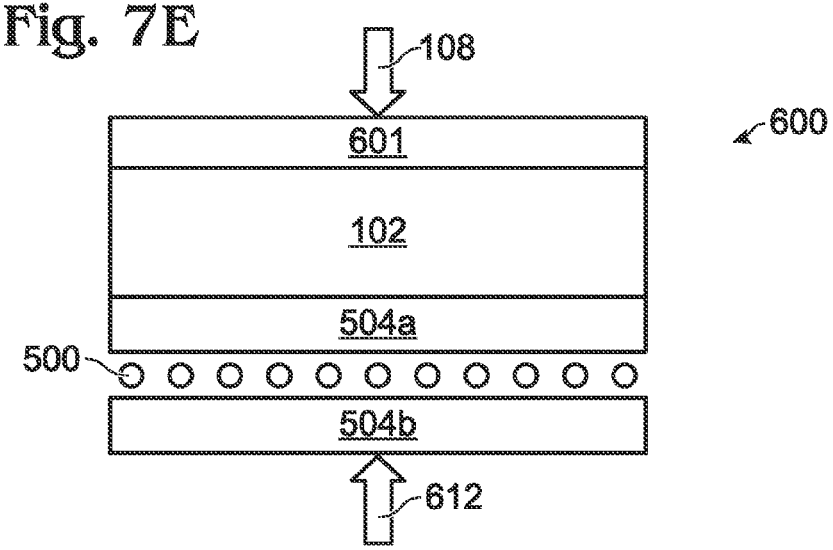

FIGS. 7A through 7G are partial cross-sectional views of the energy-efficient window further comprising metal oxide nanocrystals, in addition to metal nanostructures. The metal oxide nanocrystals 500 may be formed in a number of configurations. The metal oxide nanocrystals may be formed overlying a second surface 502 of the first film layer 102, as shown in FIG. 7A, embedded in a second film layer 504 that overlies first film layer second surface 502, as shown in FIG. 7B, sandwiched between a first surface 506 of the second film layer 504 and the second surface 502 of the first film layer 102, as shown in FIG. 7C, overlying the second surface 502 of the first film layer 102 and encapsulated by a dielectric shell 508, as shown in FIG. 7D, sandwiched between two sheets of dielectric material 504a and 504b overlying first film layer second surface 502, as shown in FIG. 7E, or combined with the metal nanostructures 104 in the first film layer 102, as shown in FIG. 7F. For simplicity, the first film layer is simply designated as 102, but it should be understood that the first film layer of FIGS. 7A through 7E may be configured as described above in the explanation of FIGS. 1A through 1E. In another aspect as shown in. FIG. 7G, both the metal nanostructures 104 and metal oxide nanocrystals 500 are formed directly on the substrate first surface 602. As shown, the metal nanostructures 104 are encapsulated with a dielectric shell 110 and the metal oxide nanocrystals are encapsulated with dielectric shell 508. In another aspect not shown, the metal nanostructures and metal oxide nanocrystals are not encapsulated, but simply covered with a dielectric film sheet. It should also be understood that the metal nanostructures may be enabled using the rod, spheroid, or triangular plate morphologies.

The metal oxide nanocrystals have a first absorption in a band of wavelengths less than visible wavelengths (e.g. UV), and a second absorption in a band of wavelengths greater than visible wavelengths (e.g. IR greater than 1.5 microns). The first and second absorptions are greater than any absorption (caused as a result of the metal oxide nanocrystals) in the band of visible wavelengths. As a result, the window 600 absorbs light 108 incident to the first substrate second surface 604 more efficiently in wavelength bands both less than visible wavelengths and greater than visible wavelengths, as compared to visible wavelengths. Further, the window 600 absorbs light 612 incident to the first substrate first surface 602 more efficiently at wavelengths greater than visible wavelengths. Details of the metal oxide nanocrystals and their optical characteristics have been presented above in the explanations of FIGS. 5A through 5F, and are not repeated here in the interest of brevity.

FIG. 8 is a partial cross-sectional view of a variation of the energy-efficient window of FIG. 7A. In this aspect, a second substrate 800 glass) overlies the first substrate second surface 604, and is transparent in visible wavelengths of light. An insulating medium 802, such as vacuum sealed air, is interposed between the second substrate 800 and the first substrate second surface 604, transparent in the visible wavelengths of light. Although not specifically shown, a second substrate and insulating medium may be added to the window of FIGS. 7B through 7G in a manner similar to FIG. 8. Alternatively but not shown, the metal nanostructures and metal oxide nanocrystals can be formed on an interior surface of either the first or second substrates adjacent to the insulating medium.

Returning to FIG. 1A for example, a mix of randomly oriented silver nanorods with different aspect ratios in a dielectric film is shown. As disclosed in parent application Ser. No. 13/558,396, and explained in Reference [7], metallic nanoparticles having a shape anisotropy such as metal nanorods or spheroids can be used as a light polarizer, since the nanoparticles possess different light polarizability along their long and short axis. When the polarization plane is parallel to the long-axis direction of the spheroidal nanorods, the absorption peak is typically observed at longer wavelength.

On the other band, when the polarization plane is perpendicular to the long-axis direction, the absorption peak is observed at shorter wavelength. The extinction ratio of polarization is represented by the ratio of perpendicular transmission over the parallel transmission. Similarly, when metal nanorods or spheroids with different aspect ratios are combined with random orientation, scattering and absorption bands can be achieved in two different wavelengths, typically at short and long wavelengths. Average absorption and scattering cross-sections of light for randomly oriented spheroids embedded in a host matrix are calculated by [7], $$\langle C_{abs} \rangle = \frac{2\pi n_m}{3\lambda} \text{Im}\{\alpha_\| + 2\alpha_\perp\}$$

$$\langle C_{sca} \rangle = \left(\frac{2\pi n_m}{\lambda}\right)^4 \frac{1}{18\pi} (|\alpha_\||^2 + 2|\alpha_\perp|^2)$$

where $\langle C_{abs} \rangle$ and $\langle C_{sca} \rangle$ are the average absorption and scattering cross-sections of light with wavelength $\lambda$, $\alpha_\|$ and $\alpha_\perp$ are the polarizability of the spheroids parallel and perpendicular to the spheroid rotation axis, respectively, and $n_m$ is the refractive index of the binding matrix. These polarizabilities are further calculated by the following expressions:

$$\alpha_\| = \frac{V}{4\pi} \frac{\varepsilon_p - \varepsilon_m}{L_\|(\varepsilon_p - \varepsilon_m) + \varepsilon_m}$$

$$\alpha_\perp = \frac{V}{4\pi} \frac{\varepsilon_p - \varepsilon_m}{L_\perp(\varepsilon_p - \varepsilon_m) + \varepsilon_m}$$

In which V is the volume of an individual metal nanoparticle, $\varepsilon_p$ is the complex dielectric constant of the metal, is the real dielectric constant of the binding matrix (where $\varepsilon_m = n_m^2$), and $L_\|$ and $L_\perp$ are geometrical factors which depend on the shape of the spheroids [7].

Figure 9A:
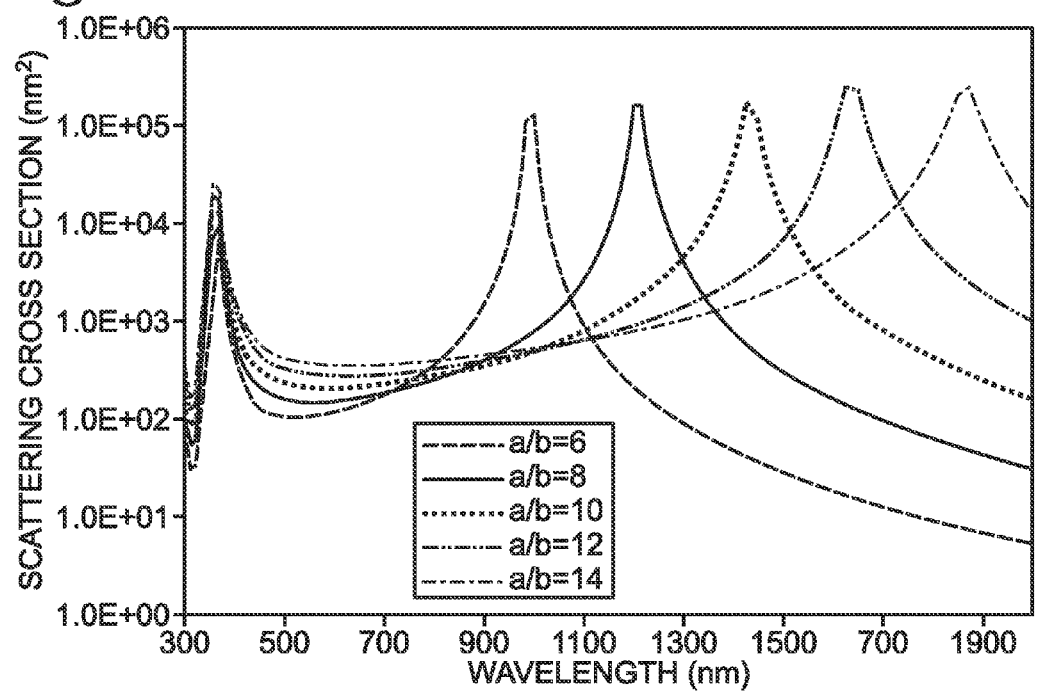
FIGS. 9A and 9B are graphs depicting the calculated results of average absorption and scattering cross-sections of light with the wavelength A, for silver spheroids with aspect ratios of 6-14 embedded in a glass matrix ($n_m$=1.5).
Figure 9B:
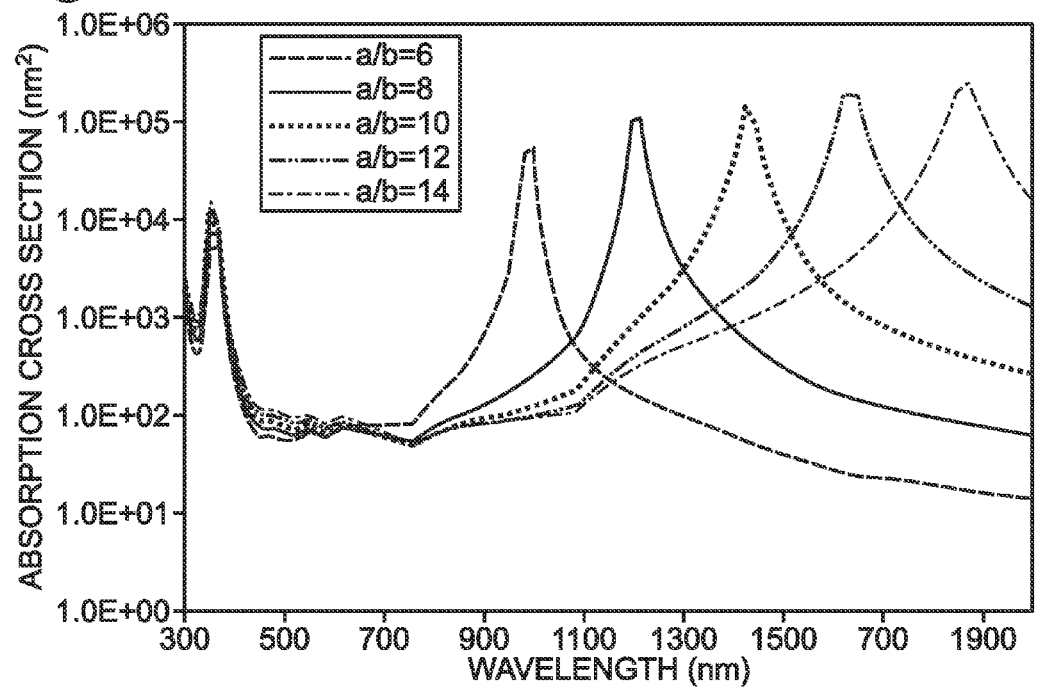

FIGS. 9A and 9B are, respectively, graphs depicting the calculated results of average absorption and scattering cross-sections of light with the wavelength $\lambda$, for silver spheroids with aspect ratios of 6~14 embedded in a glass matrix ($n_m=1.5$). The results show that scattering is stronger than absorption, meaning that a window film containing these silver particles will absorb some light, but scatter more.

The transmission, T, of light through a slab of glass thickness, having attenuation coefficient, $\alpha_{ext}$, is given by the Beer's Law:

$$T = \frac{I_t}{I_i}$$

$$I_t = I_i \exp(-\alpha_{ext} h)$$

where $I_i$ and $I_t$ are the incident and transmitted intensities, respectively. The attenuation coefficient for randomly oriented spheroids with spheroid volume, V, and volume fill factor, $\eta$, is given by $$\alpha_{ext} = \frac{\eta}{V}(\langle C_{abs} \rangle + \langle C_{sca} \rangle)$$

If the glass contains a mix of randomly oriented spheroids having different aspect ratios, volumes, fill factors, scattering, and absorption coefficients, the attenuation coefficient is then given by $$\alpha_{ext} = \sum_j \frac{\eta_j}{V_j}(\langle C_{abs} \rangle_j + \langle C_{sca} \rangle_j)$$

Figure 10A:
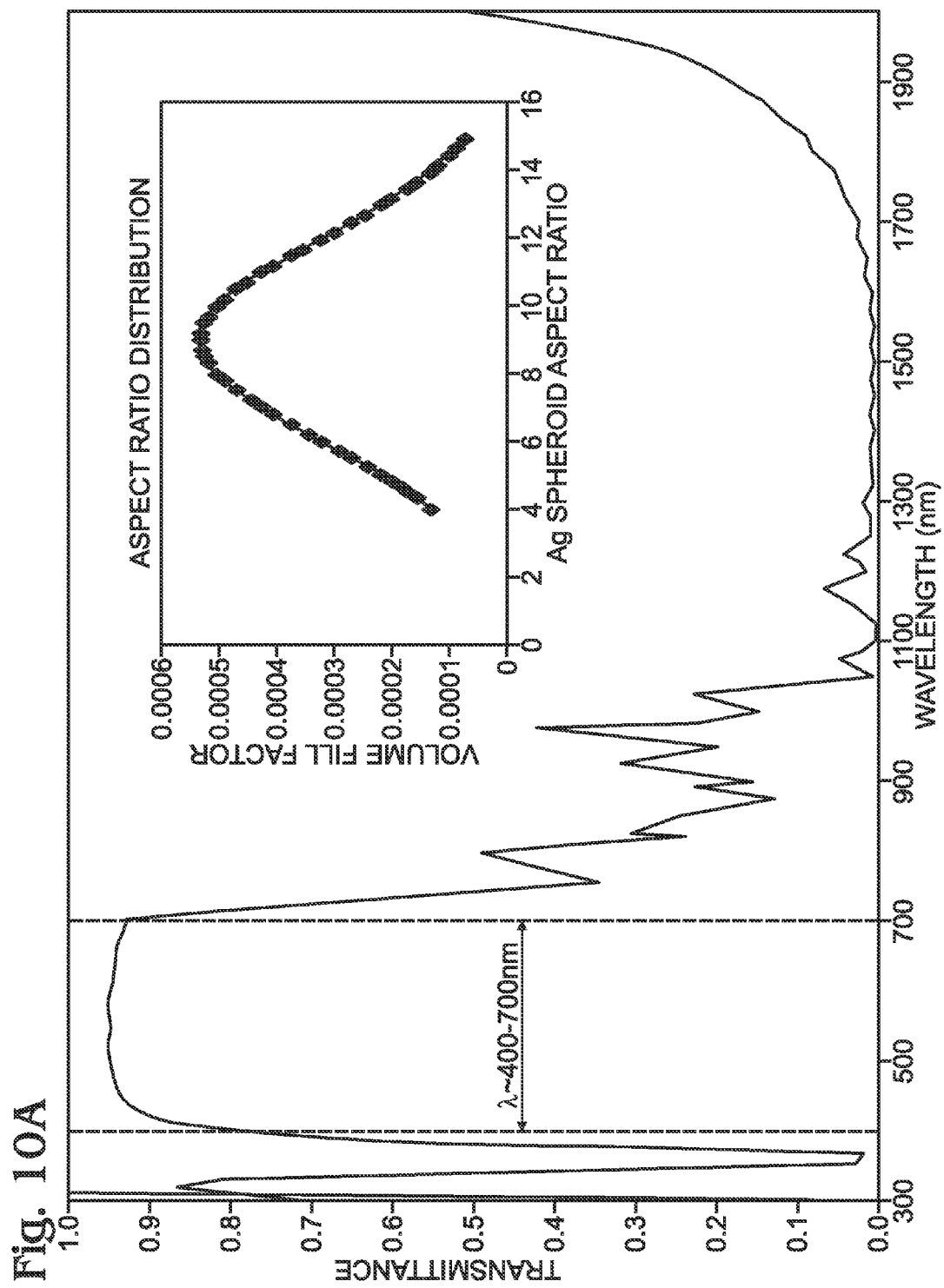
FIGS. 10A and 10B show, respectively, the calculated transmittance of glass films containing randomly oriented silver spheroids, and the associated distribution of aspect ratios.
Figure 10B:
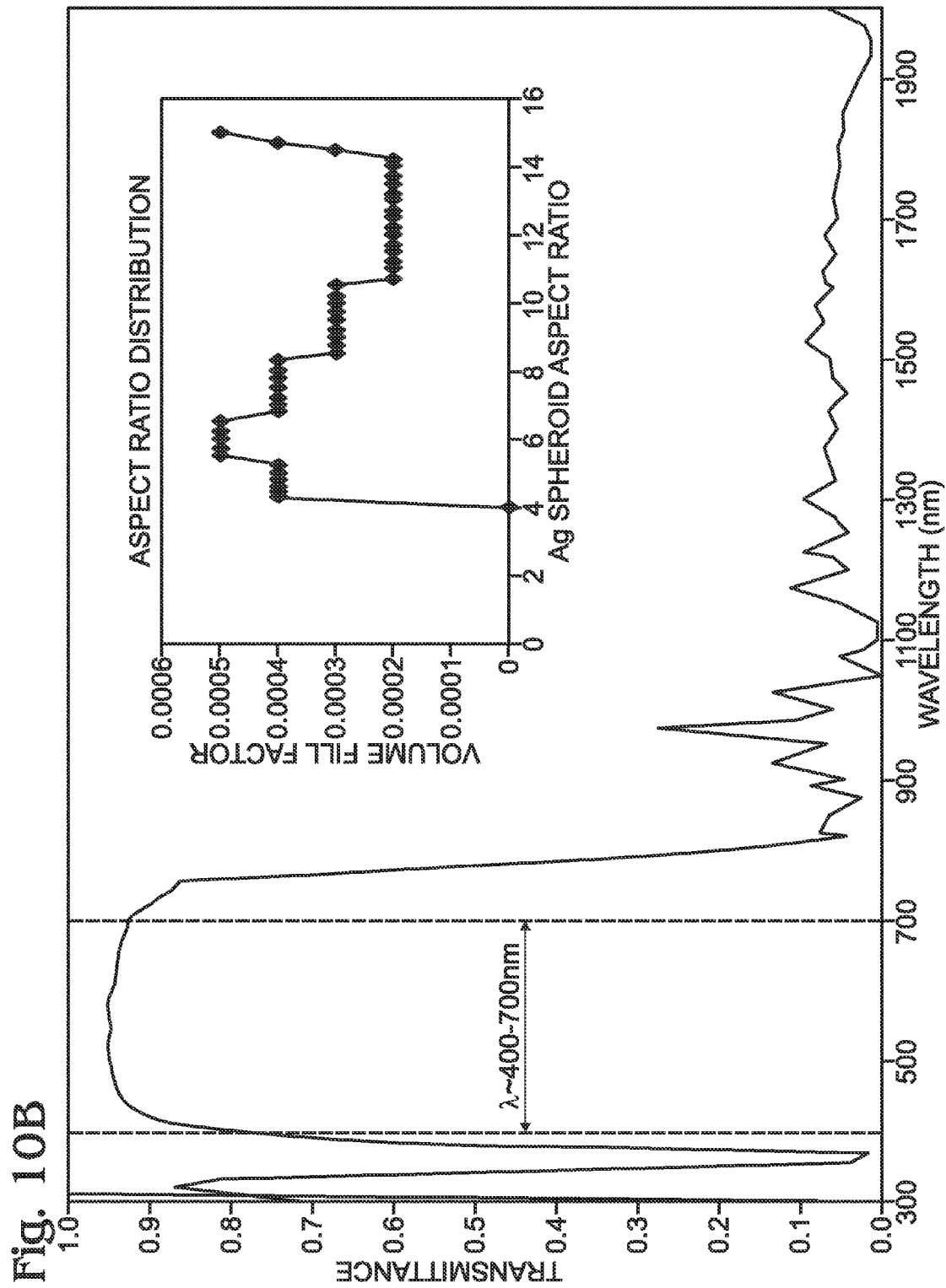

FIGS. 10A and 10B show, respectively, the calculated transmittance of glass films containing randomly oriented silver spheroids, and the associated distribution of aspect ratios. The film thickness examined is 0.5 μm. FIG. 10A shows a Gaussian distribution of aspect ratios and FIG. 10B shows a distribution that gives more uniform reduction of near infrared (NIR) light from 800 nm to 2 μm. In both cases, visible light transmission of over 90% can be achieved according to the calculation.

The transparent solar film may include metal oxide nanocrystals that are incorporated in a dielectric film and combined with metal nanostructures to achieve broadband rejection of infrared heat. As shown in FIGS. 5A through 5F, a dielectric layer with metal oxide nanocrystals absorbs wavelengths in the solar spectrum of UV and short-IR band. The nanocrystals can be inorganic metal oxide particles such as indium tin oxide, antimony tin oxide, indium zinc oxide, gallium zinc oxide or aluminum zinc oxide. A top dielectric layer with plasmonic metal nanostructures rejects wavelengths in UV and/or near-IR spectrum. Plasmonic nanostructures can include shapes such as rods, spheroids, or plates. Nanostructures can also include a core-shell structure, for example, silica-coated nanostructures, which improve the environmental stability of plasmonic structures. The materials can be chosen to be metal such as silver, gold, or copper. With the combined two-layer structures described above, the solar film can selectively reject the entire solar heat spectrum except the visible band, thus significantly reducing the cooling cost of the buildings. Energy saving from indoor heating can also be realized from the solar film by absorbing the thermal infrared (2-8 μm) generated from inside the building with a bottom dielectric layer that includes metal oxide nanocrystals, reflecting back partially the radiative heat that is being emitted.

FIGS. 5A through 5F, 7A through 7G, and 8 are not intended to describe every possible aspect of the solar film. Other variations and embodiments of the invention will occur to those skilled in the art, such as having the two layers in a different order, or another transparent substrate between the top and bottom layers. The configuration of one or two layers can be adapted for geographical area. For example, in hot climate such as in southern regions of the United States, a window film that uses plasmonic layer metal nanostructures may be desired in the interest of cooling buildings by blocking excessive solar heat that enters through the windows. Alternatively, in the cold climate such as northern region of the United States, a window film that uses metal oxide nanocrystals layer could save heating costs by keeping radiated heat inside the building. In the Northwest of the United States where the winter climates are mostly rainy with very little sunlight, the two-layer solar control film of FIGS. 7A through 7G, or 8 might be desirable.

To prepare these types of solar film, the particles (metal nanostructures and/or metal oxide nanocrystals) are deposited on a substrate or film in a manner that protects them from mechanical damage. This can be accomplished either by individually coating the particles, and then applying a protective overcoat, or by initially mixing the particles with a binder material in solution and depositing them on the substrate as a composite film. A number of different solution coating methods could be used for coating the particle-containing formulations, including spin-coating, dip-coating, blade-coating, or spray-coating. The particles can also be dispersed in a thermoplastic binder, and then used to prepare free-standing films by extrusion or other film-forming methods, and the film subsequently attached to the window substrate.

For the IR-absorbing silver nanostructures, this method of film deposition has been demonstrated by spray-coating a film of Ag nanostructures directly to a glass substrate. The nanostructures (avg. diameter=147.7 nm) were supplied as a water dispersion (1 mg Ag/1 ml dispersion). The surface tension and relatively low volatility of water, led to particle aggregation as the film dried, making it less desirable as a coating solvent. To solve this problem, the silver nanostructures were centrifuged out of the water dispersion (10000 rpm/20 min.), the water removed, and the nanostructures redispersed in either ethanol, isopropanol, or a mixture of the two alcohols. An example formulation was prepared by centrifugation of 400 µl of Ag nanoparticles dispersed in water, followed by re-dispersion of the particles in a mixture of 400 µl ethanol and 400 µl isopropanol. The resulting formulation was then spray-coated onto a glass substrate using an air-powered sprayer (70-80 psi). After coating the initial layer of Ag nanostructures, an overcoat of polyvinylbutyral (PVB) was applied by spin-coating over the Ag nanostructure layer (PVB solution=3% by weight in 50/50 ethanol/isopropanol).

Figure 11:
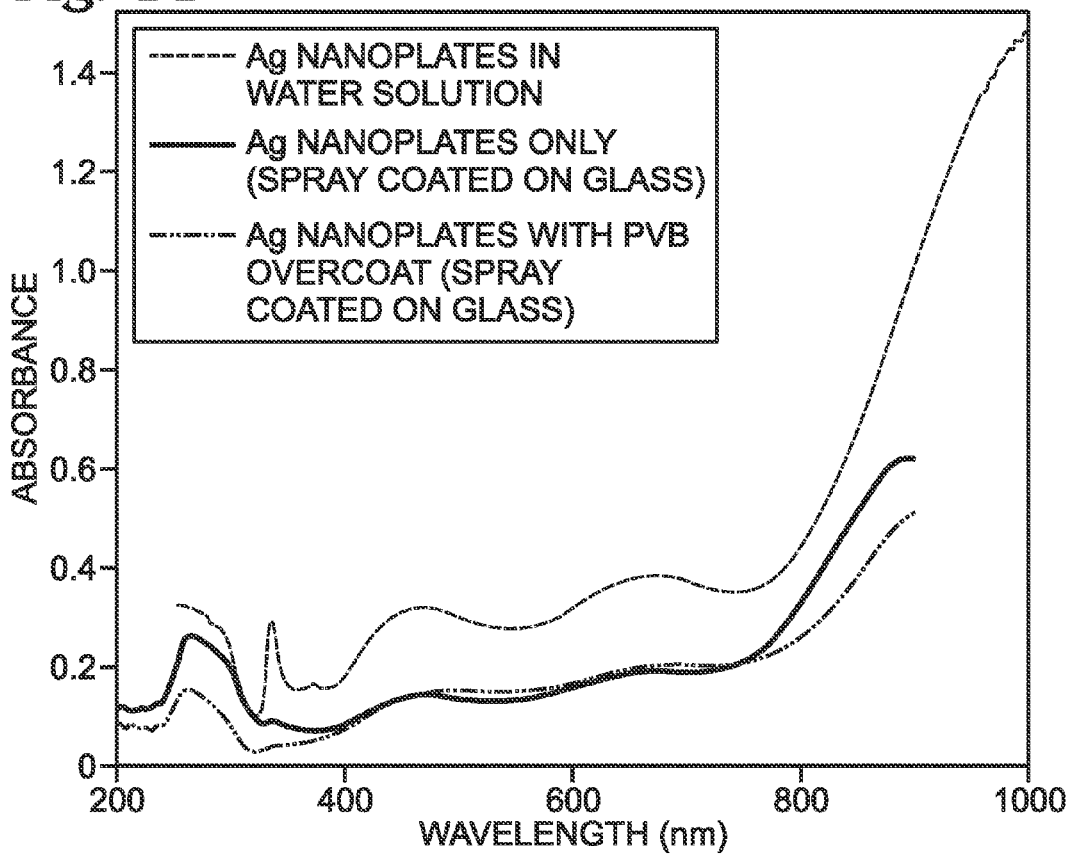
FIG. 11 is a graph comparing the optical properties of Ag triangular plate nanostructures (nanoplates) in water solution to Ag triangular plate coated films.

FIG. 11 is a graph comparing the optical properties of Ag triangular plate nanostructures (nanoplates) in water solution to Ag triangular plate coated films. The similar results indicate that the basic structure and morphology of the particles has not been modified by the coating process. In particular, the desired near-IR absorbance/reflectance is high while very little light is absorbed or reflected in the visible region of the spectrum (400-700 nm). Also, the substrate transparency is maintained after application of the film.

Also disclosed is a method of manufacturing low cost metal oxide nanocrystals such as metal-doped zinc oxide nanocrystais using precursor agents fabricated with reduced complexity. A recently reported pathway [6] for the preparation of highly doped zinc oxide nanoparticles utilizes the cis-diols for the growth of the nanoparticles. Despite their advantages, cis-diols with a high boiling point, such as 1,2-dodecanediol and similar, suffer from high prices, which makes the process of particle preparation cost-prohibitive, as compared to other technologies. In order to produce the desired nanoparticles, the vicinal diol can be replaced with a low boiling point mono-alcohol. In addition, amine may perform in the similar fashion, but through the different reaction mechanism, with oleylamine utilized for this purpose. Thus, the final product cost is significantly diminished by the use of the cheaper chemicals.

Figure 12:
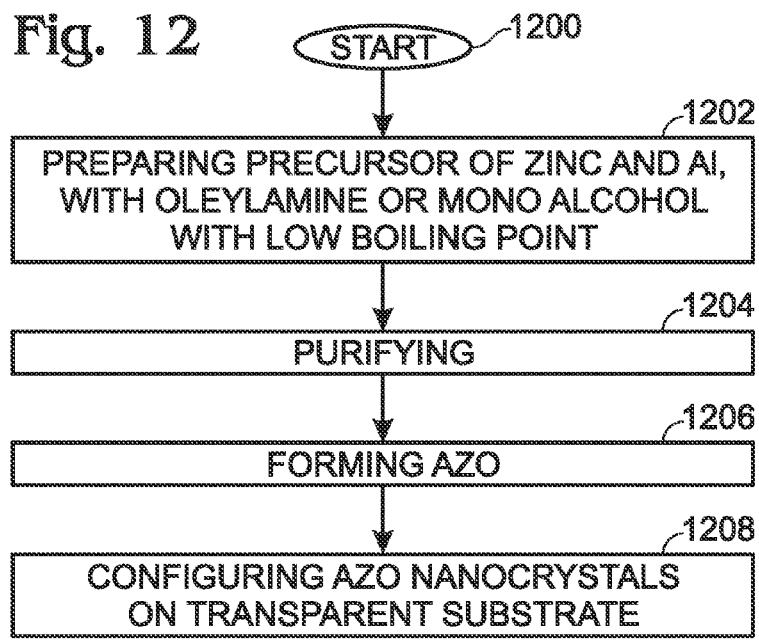
FIG. 12 is a flowchart illustrating a method for fabricating a solar film optical absorption material.

FIG. 12 is a flowchart illustrating a method for fabricating a solar film optical absorption material. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1200.

Step 1202 prepares a precursor mixture including zinc, aluminum, and a material such as oleylamine or a mono alcohol with a high boiling point. The mono-alcohol may be 1-hexadecanol, 1-tetradecanol, or 1-dodecanol for example. Step 1204 purifies the precursor. Purification involves addition of a non-solvent to the reaction mixture with centrifugation of the nanoparticles, which can then redispersed in a suitable solvent (for example: hexane or toluene) and precipitated by the addition of the non-solvent again. The cycles can be repeated. The non-solvent may be methanol, ethanol, or acetone for example. Step 1206 forms aluminum-doped zinc oxide (AZO) nanocrystals. Step 1208 configures the AZO nanocrystals with a substrate transparent in the visible wavelengths of light, as described in detail above (FIGS. 5A-5F). For example, the AZO nanocrystals may be configured with the substrate through spin-coating, dip-coating, blade-coating, spray coating the AZO nanocrystals on the substrate, or embedding the AZO nanocrystals in a dielectric film.

Solar film films layers have been provided with scattering and absorption properties outside the visible wavelengths of light. Examples of particular materials, morphology, film layer order, and fabrication methods have been presented to illustrate the invention. However, the invention is not limited to merely these examples. Other variations and embodiments of the invention will occur to those skilled in the art.

We claim:

1. An energy-efficient transparent solar film comprising:
   a first film layer including metal nanostructures having plasmon resonances in wavelength bands selected from a first group consisting of:
   (a) wavelengths greater than visible wavelengths, and
   (b) wavelengths both less than and greater than visible wavelengths,
   the metal nanostructures having no plasmon resonance at visible wavelengths; and,
   wherein the first film layer transmits incident light more efficiently in the visible wavelengths than in the first group of wavelengths.

2. The solar film of claim 1 wherein the metal nanostructure morphology is selected from a group consisting of rods, spheroids, and a combination of rods and spheroids, having plasmon resonances in the ultra violet A (UVA) wavelength and near infrared (NIR) wavelength bands.

3. The solar film of claim 2 wherein the metal nanostructures have a maximum cross-sectional dimension of 200 nanometers (nm) and a minimum cross-sectional dimension of 5 nm.

4. The solar film of claim 2 wherein the metal nanostructures have a long axis and a short axis, with an aspect ratio between axes in a first range of about 4 to 15.

5. The solar film of claim 4 wherein the metal nanostructures comprise a Gaussian distribution of aspect ratios in the first range, with a random long axis orientation.

6. The solar film of claim 1 wherein the metal nanostructures have a triangular plate morphology with a plasmon resonance in the NIR band of wavelengths.

7. The solar film of claim 6 wherein the triangular plate metal nanostructures have side lengths in a range between about 50 and 250 nm, and a thickness in a range of about 10 to 50 nm.

8. The solar film of claim 1 wherein each metal nanostructure comprises:
   a metal core; and,
   a shell surrounding the metal core made from a material selected from a group consisting of silica, a metal oxide, and semiconductor oxide.

9. The solar film of claim 1 wherein the metal nanostructures are a material selected from a group consisting of silver (Ag), gold (Au), copper (Cu), titanium nitride (TiN), indium tin oxide (ITO), aluminum-doped zinc oxide (AZO), and gallium-doped zinc oxide (GZO).

10. The solar film of claim 1 further comprising:
    metal oxide nanocrystals formed in a configuration selected from a second group consisting of included in the first film layer and included in a second film layer, the metal oxide nanocrystals having a first absorption in a band of wavelengths less than visible wavelengths, a second absorption in a band of wavelengths greater than visible wavelengths, where the first and second absorptions are greater than any absorption in the band of visible wavelengths; and, wherein the solar film transmits incident light more efficiently in the visible wavelengths than in wavelengths both less than visible wavelengths and greater than visible wavelengths.

11. The solar film of claim 10 wherein the metal oxide nanocrystals are selected from a group consisting of indium tin oxide, antimony tin oxide, indium zinc oxide, GZO, and AZO.

12. The solar film of claim 10 wherein each metal oxide nanocrystal comprises:
a metal oxide core; and,
a shell surrounding the metal oxide core made from a material selected from a group consisting of titanium oxide and tin oxide.

13. The solar film of claim 10 wherein the metal oxide nanocrystal first absorption occurs in the band of UV wavelengths and second absorption occurs in the band of IR wavelengths greater than 1.5 microns.

14. An energy-efficient window comprising:
a first substrate with a first surface and a second surface, transparent in visible wavelengths of light;
metal nanostructures overlying the first substrate first surface having plasmon resonances at wavelength bands selected from a first group consisting of:
(a) wavelengths greater than visible wavelengths, and
(b) wavelengths both less than and greater than visible wavelengths,
the metal nanostructures having no plasmon resonance at visible wavelengths; and,
wherein the window transmits light incident to the substrate second surface more efficiently in the visible wavelengths than in the wavelength bands selected from the first group.

15. The window of claim 14 wherein the metal nanostructure morphology is selected from a group consisting of rods, spheroids, and a combination of rods and spheroids, having a maximum cross-sectional dimension of 200 nanometers (nm) and a minimum cross-sectional dimension of 5 nm, a long axis and a short axis, with an aspect ratio between axes in a range of about 4 to 15, and plasmon resonances in ultra violet A (INA) wavelength and near infrared (NIR) wavelength bands.

16. The window of claim 14 wherein the metal nanostructures have a triangular plate morphology, with side lengths in a range between about 50 and 250 nm, a thickness in a range of about 10 to 50 nm, and a plasmon resonance in the NIR band of wavelengths.

17. The window of claim 14 wherein each metal nanostructure comprises:
a metal core; and,
a shell surrounding the metal core made from a material selected from a group consisting of silica, a metal oxide, and semiconductor oxide.

18. The window of claim 14 wherein the metal nanostructures are a material selected from a group consisting of silver (Ag), gold (Au), copper (Cu), titanium nitride (TiN), indium tin oxide (ITO), aluminum-doped zinc oxide (AZO), and gallium-doped zinc oxide (GZO).

19. The window of claim 14 further comprising:
metal oxide nanocrystals formed in a configuration selected from a second group consisting of included in the first film layer and included in a second film layer overlying the first substrate first surface, the metal oxide nanocrystals having a first absorption in a band of wavelengths less than visible wavelengths, a second absorption in a band of wavelengths greater than visible wavelengths, where the first and second absorptions are greater than any absorption in the band of visible wavelengths;
wherein the window absorbs light incident to the first substrate second surface more efficiently in wavelength bands both less than visible wavelengths and greater than visible wavelengths, as compared to visible wavelengths; and,
wherein the window absorbs light incident to the first substrate first surface more efficiently at wavelengths greater than visible wavelengths.

20. The window of claim 19 wherein the metal oxide nanocrystals are selected from a group consisting of indium tin oxide, antimony tin oxide, indium zinc oxide, GZO, and AZO.

21. The window of claim 19 wherein each metal oxide nanocrystal comprises:
a metal oxide core; and,
a shell surrounding the metal oxide core made from a material selected from a group consisting of titanium oxide and tin oxide.

22. The window of claim 19 wherein the metal oxide nanocrystal first absorption occurs in the UV band of wavelengths and the second absorption occurs in the IR band wavelengths greater than 1.5 microns;
transparent in visible wavelengths of light; and,
an insulating medium interposed between the second substrate and the first substrate second surface, transparent in the visible wavelengths of light.

23. The window of claim 19 further comprising:
a second substrate overlying the first substrate second surface, transparent in visible wavelengths of light; and,
an insulating medium interposed between the second substrate and the first substrate second surface, transparent in the visible wavelengths of light.

* * * * *

UNITED STATES PATENT AND TRADEMARK OFFICE
CERTIFICATE OF CORRECTION

| | | |
|---|---|---|
| PATENT NO. | : 9,091,812 B2 | Page 1 of 1 |
| APPLICATION NO. | : 13/872473 | |
| DATED | : July 28, 2015 | |
| INVENTOR(S) | : Akinori Hashimura et al. | |

It is certified that error appears in the above-identified patent and that said Letters Patent is hereby corrected as shown below:

In the Claims

In column 13, at line 49, claim 15, the word term "(UVA)" has been incorrectly printed as "(INA)".

In column 14, claim 22, remove all content at lines 44-47. Claim 22 should read as follows:

22. The window of claim 19 wherein the metal oxide nanocrystal first absorption occurs in the UV band of wavelengths and the second absorption occurs in the IR band wavelengths greater than 1.5 microns.

Signed and Sealed this
First Day of December, 2015

Michelle K. Lee
*Director of the United States Patent and Trademark Office*